United States Patent
Takenaka

(10) Patent No.: US 9,676,437 B2
(45) Date of Patent: Jun. 13, 2017

(54) HEADLIGHT STRUCTURE FOR VEHICLE

(71) Applicant: HONDA MOTOR CO., LTD., Tokyo (JP)

(72) Inventor: Nobuyuki Takenaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

(21) Appl. No.: 14/848,906

(22) Filed: Sep. 9, 2015

(65) Prior Publication Data

US 2016/0090138 A1  Mar. 31, 2016

(30) Foreign Application Priority Data

Sep. 26, 2014  (JP) ................. 2014-197118

(51) Int. Cl.
| | |
|---|---|
| *B62J 6/02* | (2006.01) |
| *F21V 8/00* | (2006.01) |
| *B60Q 1/00* | (2006.01) |
| *F21S 8/10* | (2006.01) |

(52) U.S. Cl.
CPC .............. *B62J 6/02* (2013.01); *B60Q 1/0041* (2013.01); *B60Q 1/0052* (2013.01); *F21S 48/1159* (2013.01); *F21S 48/1233* (2013.01); *F21S 48/1747* (2013.01); *F21S 48/215* (2013.01); *F21S 48/225* (2013.01); *F21S 48/2268* (2013.01); *F21S 48/2281* (2013.01); *F21S 48/2293* (2013.01); *G02B 6/0001* (2013.01); *G02B 6/0073* (2013.01)

(58) Field of Classification Search
CPC ........ B62J 6/02; B60Q 1/0041; B60Q 1/0052; F21S 48/1159; F21S 48/1233; F21S 48/1747; F21S 48/215; F21S 48/225; F21S 48/2268; F21S 48/2281; F21S 48/2293; G02B 6/0001; G02B 6/0073
See application file for complete search history.

(56) References Cited

U.S. PATENT DOCUMENTS

| | | | |
|---|---|---|---|
| 2011/0063863 A1* | 3/2011 | Hotei | B60Q 1/0041 362/475 |
| 2012/0170301 A1* | 7/2012 | Verhee | F21S 48/215 362/551 |

FOREIGN PATENT DOCUMENTS

JP     2013-178874 A     9/2013

* cited by examiner

*Primary Examiner* — Thomas M Sember
(74) *Attorney, Agent, or Firm* — Birch, Stewart, Kolasch & Birch, LLP

(57) ABSTRACT

A headlight structure for ensuring easy structural designing of a light guide member to enhance the degree of the freedom of shape. Reflectors and left and right lenses are disposed respectively on the left and right sides of the center of a vehicle body. Second light sources are attached respectively to the left and right of a light guide member which is roughly W-shaped. Attachment portions and connection portions are hidden by a light-blocking light cover. The left and right reflectors and left and right including shining portions that are visible through the lenses wherein light evenness can be enhanced within an externally visible region. The headlight can be easily enlarged in size and in diameter. The second light sources make it is easy to design the structure of the light guide member for enhancing the degree of the freedom of shape.

20 Claims, 8 Drawing Sheets

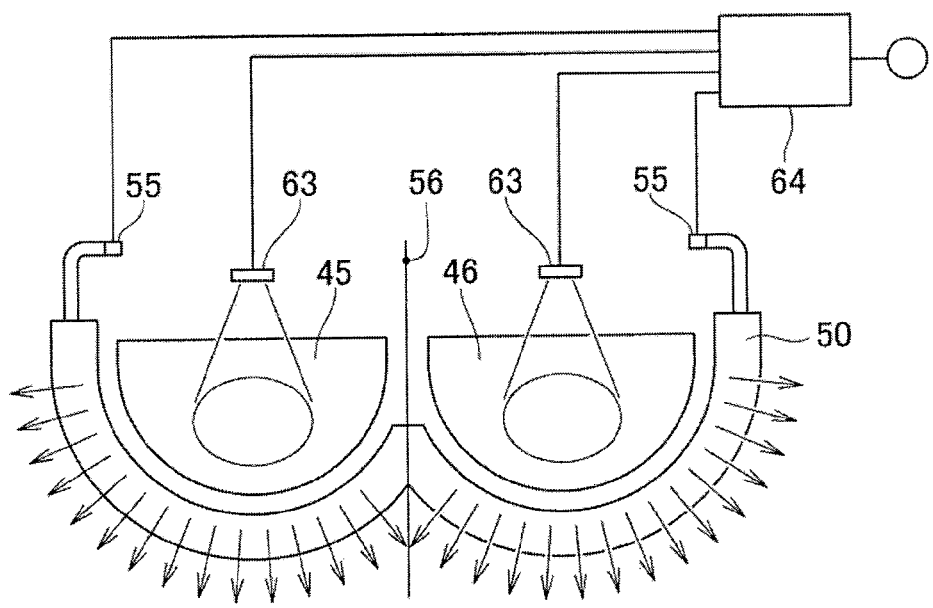
FIG. 11(a) HIGH BEAM MODE
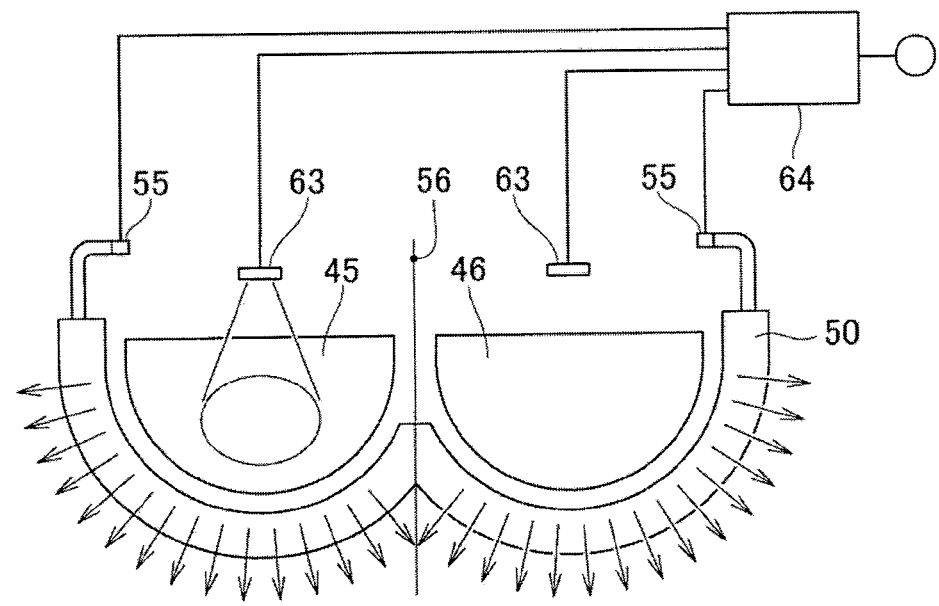
FIG. 11(b) LOW BEAM MODE

HEADLIGHT STRUCTURE FOR VEHICLE

CROSS-REFERENCE TO RELATED APPLICATIONS

The present application claims priority under 35 USC 119 to Japanese Patent Application No. 2014-197118 filed Sep. 26, 2014 the entire contents of which are hereby incorporated by reference.

BACKGROUND OF THE INVENTION

1. Field of the Invention

The present invention relates to a headlight structure for a vehicle that is suitable for a saddle type vehicle.

2. Description of Background Art

Vehicles generally have a headlight or headlights (headlamp) at a front portion or portions thereof. In recent years, a structure has come to be proposed in which a light guide member is also provided to permit a headlight to partially shine. See, for example, Japanese Patent Laid-Open No. 2013-178874, FIGS. 3 and 5.

As shown in FIG. 5 of Japanese Patent Laid-Open No. 2013-178874, four second light sources (118) (the numerals in parentheses appearing here and hereafter are reference symbols used in Japanese Patent Laid-Open No. 2013-178874) are provided on a base member (120). Semicircular arched light guide members (130a, 130b) are attached to the base member (120). Since one end and the other end of the light guide member (130a) abut on the second light sources (118), the light guide member (130a) shines as a whole. The same applies to the light guide member (130b).

As illustrated in FIG. 3 of Japanese Patent Laid-Open No. 2013-178874, the shining light guide members (130a, 130b) are visible through a lens (102). The light emitted from the second light sources (118) and entering the semicircular arched light guide member (130a) via both ends of the light guide member (130a) travels on through the light guide member (130a), to reach an uppermost position of the light guide member (130a). The light entering the semicircular arched light guide member (130b) via both ends of the light guide member (130b) travels on through the light guide member (130b), to reach a lowermost position of the light guide member (130b).

Light is known to be lowered in brightness, due to diffusion or consumption, as it travels on. It is supposed, therefore, that the second light sources (118) appear brighter than other parts. In Japanese Patent Laid-Open No. 2013-178874, the light guide portion (116) is divided into two parts, as a contrivance to suppress color shading.

Where the headlight is enlarged in size or in diameter, the number of parts into which the headlight is divided may be increased, whereby color shading can be suppressed. It is to be noted in this case, however, that the number of the second light sources (118) is increased.

Thus, in the structure according to Japanese Patent Laid-Open No. 2013-178874, structural designing of the light guide member (116) is difficult to carry out, and the degree of freedom of shape is lowered.

On the other hand, headlights are being diversified in shape. Accordingly, there is a need for a headlight structure which ensures easy structural designing of a light guide portion (light guide member) and makes it possible to enhance the degree of freedom of shape.

SUMMARY AND OBJECTS OF THE INVENTION

It is an object of an embodiment of the present invention to provide a headlight structure which ensures easy structural designing of a light guide member and makes it possible to enhance the degree of freedom of shape.

According to an embodiment of the present invention, there is provided a headlight structure for a vehicle, including a first light source accommodated in a housing for emitting headlight rays; a light-blocking light cover for covering a front surface of the housing; a reflector disposed between the light cover and the housing, and reflects forward the rays emitted by the first light source; and a lens provided on the light cover for permitting transmission of the rays therethrough while converging the rays. The headlight structure for a vehicle includes a light guide member mounted on the housing so as to fringe the periphery of the reflector for permitting light to travel on therethrough and shine; a second light source disposed in such a part as to be hidden behind the light cover when viewed from the vehicle front side for emitting light guide member rays toward the light guide member; and a control unit for controlling turned-on states of the first light source and the second light source.

According to an embodiment of the present invention, the headlight structure for a vehicle includes the reflector that is a lower half concave mirror obtained by removing an upper half from a concave mirror; the first light source is a light emitting diode for emitting rays downwardly; and the second light source is disposed above the reflector.

According to an embodiment of the present invention, the headlight structure for a vehicle includes the first light source, the reflector and a lens that are disposed on each of left and right sides of a vehicle body center line of the vehicle; the light guide member is roughly W-shaped when viewed from the vehicle front side; and the second light source is attached to each of left and right sides of the light guide member.

According to an embodiment of the present invention, the headlight structure for a vehicle includes left and right reflectors, one is a high-beam reflector for exclusive use for a high beam, and the other is a high/low-beam reflector for combined use for high and low beams. The control unit, when a high beam mode is selected, performs a control such as to turn on the left and right first light sources and to turn on the second light source and the control unit, when a low beam mode is selected, performs a control such as to turn on the first light source on the side of the high/low-beam reflector, turn on the second light source, and turn off the first light source on the side of the high-beam reflector.

According to an embodiment of the present invention, the headlight structure for a vehicle includes a shining portion which permits shining when light is introduced; and a connection portion which interconnects the second light source and the shining portion, the connection portion being circular in section.

According to an embodiment of the present invention, the second light source is covered by the light cover. Even when the second light source is brighter than other portions, therefore, it is invisible externally. As a result, unevenness in brightness within an externally visible region can be suppressed. Since the unevenness in brightness can be reduced, the headlight can be easily made larger in size or in diameter.

Since it is easy to determine the position of the second light source, structural designing of the light guide member is easy to carry out, and the degree of freedom of shape can be enhanced.

According to an embodiment of the present invention, the reflector is a lower half concave mirror. Therefore, a space on the upper side of the reflector can be utilized, and the second light source can be disposed in the upper-side space. In addition, the first light source is a light emitting diode which emits rays downwardly, and, accordingly, the first light source can also be disposed in the upper-side space. The second light source can be disposed closer to the first light source on a height basis, so that a power feeding system can be arranged in a more intensive form.

According to an embodiment of the present invention, the light guide member is roughly W-shaped as viewed from the vehicle front side, and the second light sources are attached respectively to the left and right portions of the light guide member. When the light guide member is thus W-shaped, its left and right ends and its center (three portions in total) can be covered with the light cover. Thus, the second light sources, which are brighter than the other portions, and the central portion, which is darker than the other portions, are hidden by the light cover. As a result, unevenness in brightness can be suppressed more assuredly. Even where the headlight is elongated in the left-right direction, it is sufficient to arrange only two second light sources.

According to an embodiment of the present invention, the high-beam reflector and the high/low-beam reflector are arranged juxtaposedly in the left-right direction. In addition, the light guide member is made to shine both in the high beam mode and in the low beam mode. Consequently, it is possible to optimize the light distribution of the headlight on each of the left and right sides for the exclusive use (for high beam or for low beam), and it is possible, because of the presence of the light guide member, to enhance visibility in the low beam mode.

According to an embodiment of the present invention, the light guide member includes the shining portion which permits shining when light is introduced, and the connection portion interconnecting the second light source and the shining portion with the connection portion being circular in section. The circular cross section (particularly, true circular cross section) enables guiding of a larger quantity of light than a rectangular or polygonal cross section, thereby enabling the shining portion to shine at a higher intensity.

Although the connection portions are brighter than the other portions, they are covered with the light cover. Thus, unevenness in brightness of the light guide member can be restrained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11(a) and 11(b) show operation diagrams of the headlight.

DETAILED DESCRIPTION OF THE PREFERRED EMBODIMENTS

An illustrative embodiment of the present invention will be described below, referring to the attached drawings. Note that the drawings should be looked at in accordance with the orientation of reference symbols.

Figure 1:
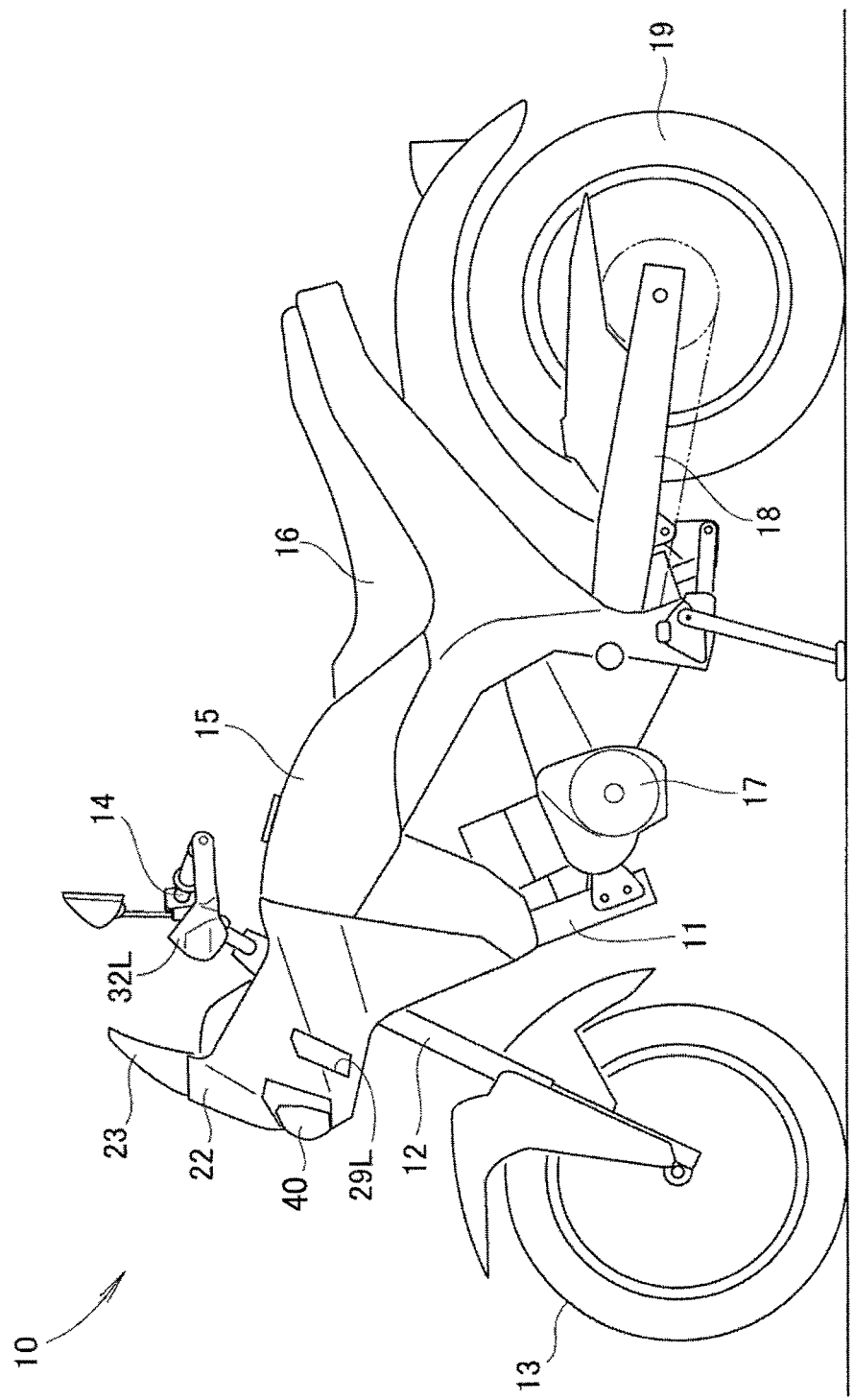
FIG. 1 is a left side view of a saddle type vehicle.

As shown in FIG. 1, a saddle type vehicle 10, which is a vehicle to be ridden by a driver seated astride a seat 16, includes a front fork 12 steerably mounted to a front portion of a body frame 11 with a front wheel 13 rotatably mounted on lower portions of the front fork 12. A steering handlebar 14 is attached to an upper portion of the front fork 12 with a fuel tank 15 and the seat 16 disposed sequentially on the rear side of the steering handlebar 14 and supported by the body frame 11. An engine 17 is disposed under the fuel tank 15 and supported by the body frame 11. A swing arm 18 extends rearwardly from the body frame 11 with a rear wheel 19 rotatably mounted on the swing arm 18. A front cowl 22 is disposed forwardly of the fuel tank 15 so as to surround the front fork 12 with a windscreen 23 mounted to an upper portion of the front cowl 22. A headlight 40 is mounted to a front portion of the front cowl 22.

Figure 2:
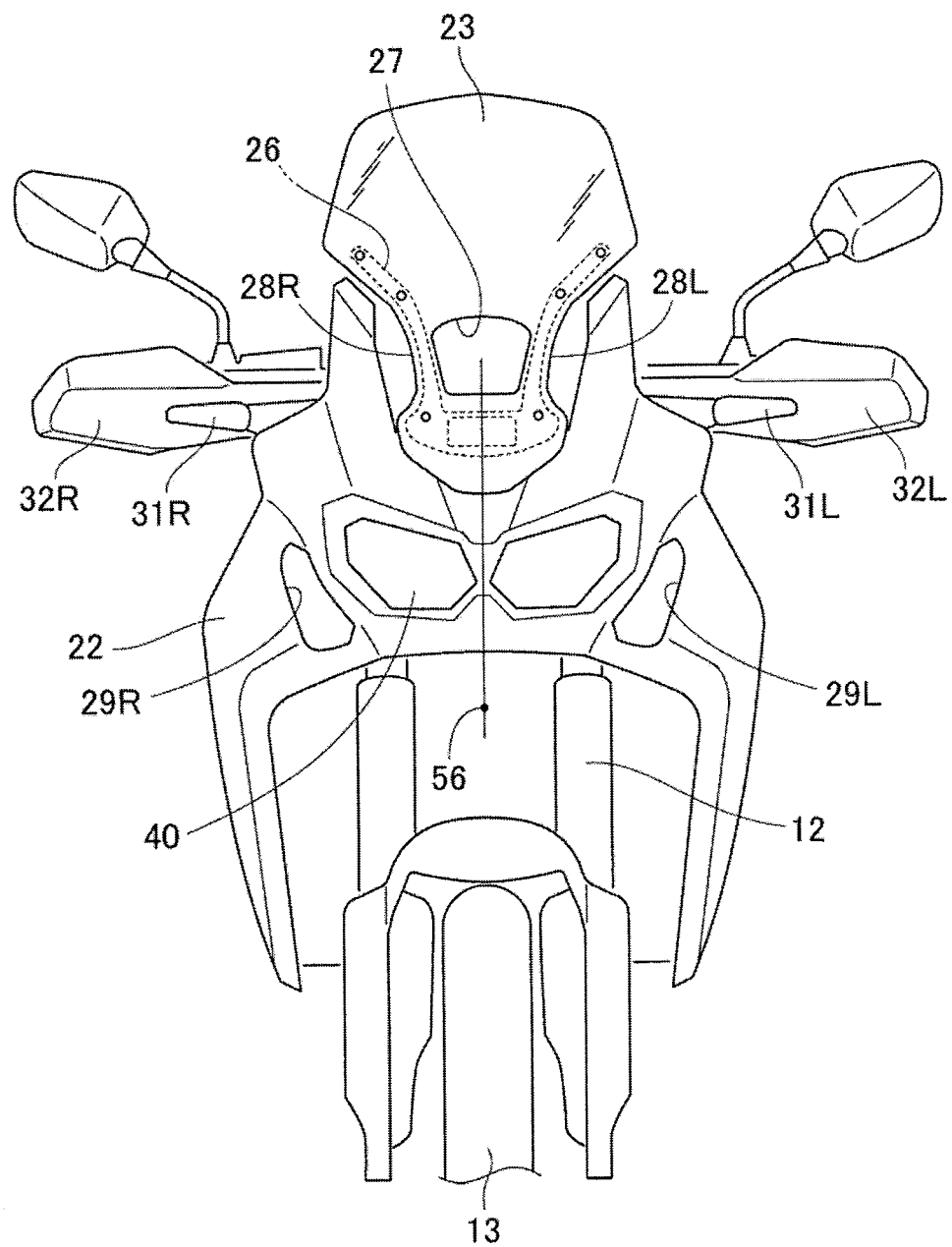
FIG. 2 is a front view of the saddle type vehicle.

As depicted in FIG. 2, the windscreen 23 is disposed over the front cowl 22. The windscreen 23 is supported by a windscreen stay 26. The windscreen 23 is a vertically elongated windscreen which is greater in vertical size than in the size in a vehicle width direction. An opening 27 penetrating the windscreen 23 in a longitudinal vehicle direction (in a face-back direction of the sheet of the drawing) is provided below the center in a height direction of the vertically elongated windscreen 23. Furthermore, the windscreen 23 has left and right cutouts 28L and 28R (L is a suffix representing the left, and R the right, here and hereafter) on the left and right sides of the opening 27 so that its lower portion below the center in the height direction thereof is necked.

The front cowl 22 is provided with the headlight 40 in the center in the vehicle width direction, airflow inlets 29L and 29R on the left and right sides of the headlight 40, and left and right turn signal lamps 31L and 31R at upper portions.

When viewed from the vehicle front side, the turn signal lamps 31L and 31R overlap with grip guards 32L and 32R on the depth side (rearward side) thereof.

Figure 3:
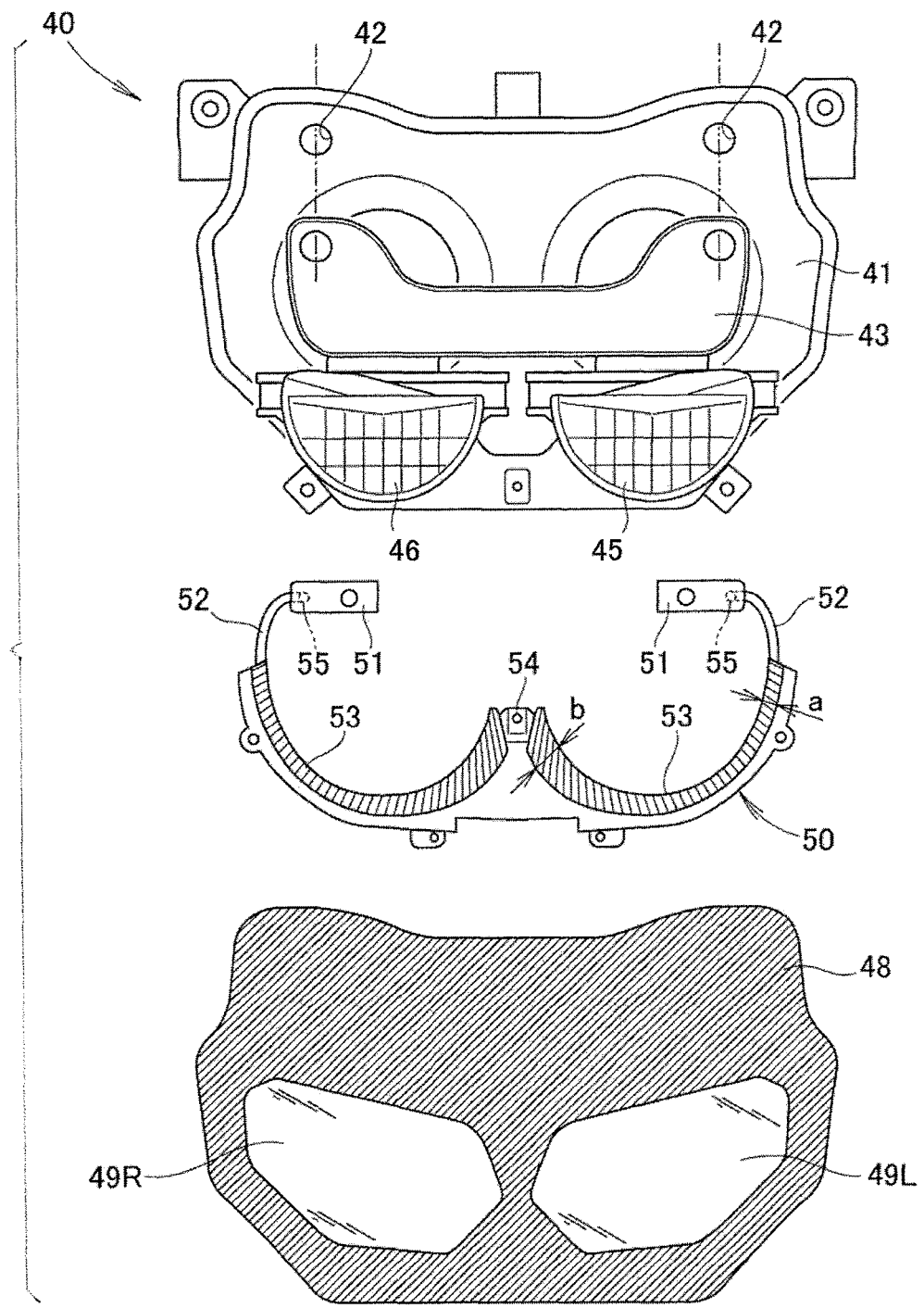
FIG. 3 is an exploded view of a headlight.

As shown in FIG. 3, the headlight 40 includes, as main elements a housing 41; an adjustment plate 43 locked to pivots 42 provided on the housing 41; a high/low-beam reflector 45 and a high-beam reflector 46 provided on the adjustment plate 43; a light guide member 50 having a roughly W-shaped form and mounted to the adjustment plate 43 along edges of the reflectors 45 and 46; a light-blocking light cover 48 to be put on the housing 41; and light-transmitting lenses 49L and 49R formed in the light cover 48.

The high/low-beam reflector 45 and the high-beam reflector 46 are each a lower-half concave mirror obtained by removing an upper half from a concave mirror.

Figure 4:
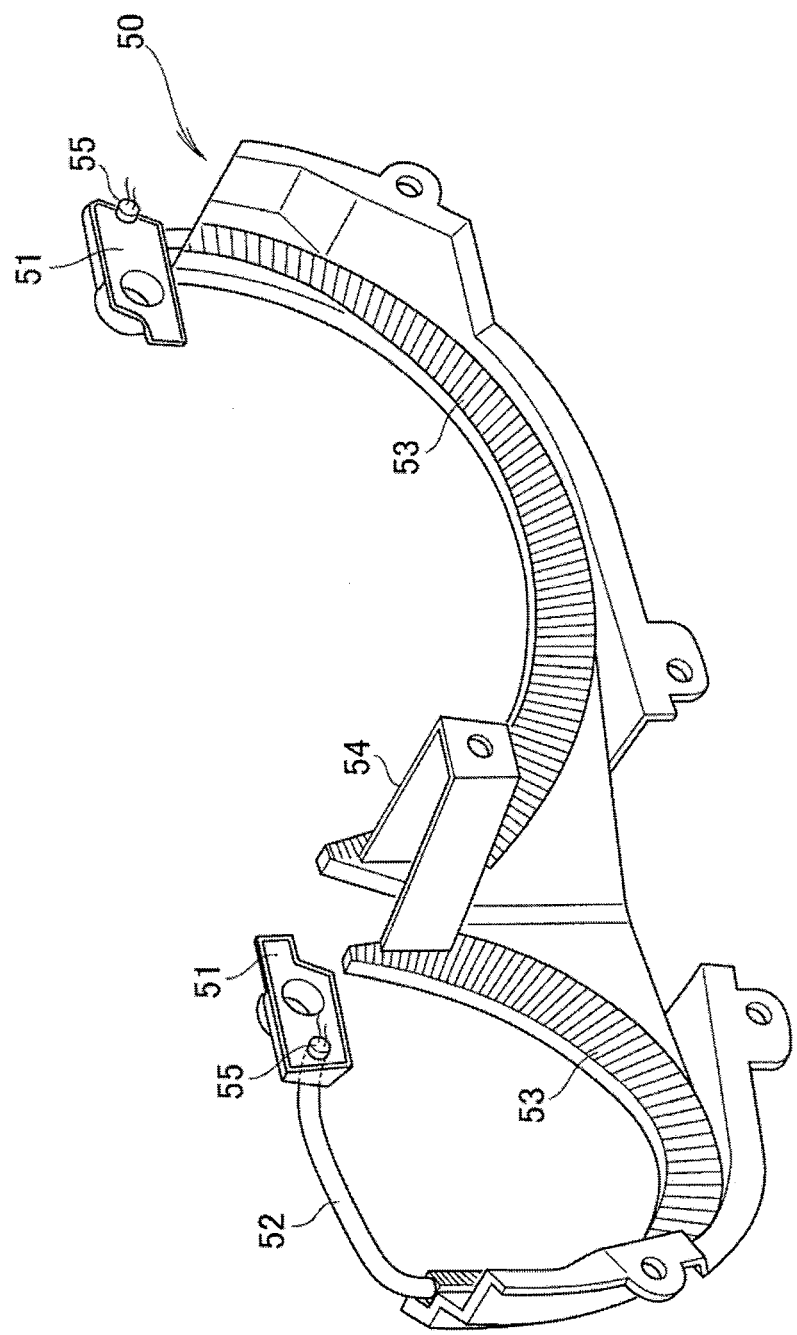
FIG. 4 is a perspective view of a light guide member.

As illustrated in FIG. 4, the light guide member 50 includes attachment portions 51; connection portions 52 (one of which is not shown) extending from the attachment portions 51; semicircular arched shining portions 53 extending from tips of the connection portions 52; and an intermediate portion 54 interconnecting the left and right shining portions 53.

In the vicinities of the attachment portions 51, second light sources 55 are attached to the connection portions 52. The second light sources 55 are light emitting diodes.

The connection portion 52 is circular in section. The sectional shape is desirably a true circle, but may be an ellipse or an oblong.

Fresnel cutting is applied to the shining portions 53. More specifically, the shining portions 53 are cut into the shape of minute sawteeth, and the sawtooth surface serves as diffuse reflection surfaces, so that these portions shine remarkably as compared with other portions. In addition, the shining portions 53 are shaped to increase in width as the distance from the second light source 55 increases so that the width b at a central portion of the light guide member 50 is greater than the width a at both ends thereof (a<b), as shown in FIG. 3.

Figure 5:
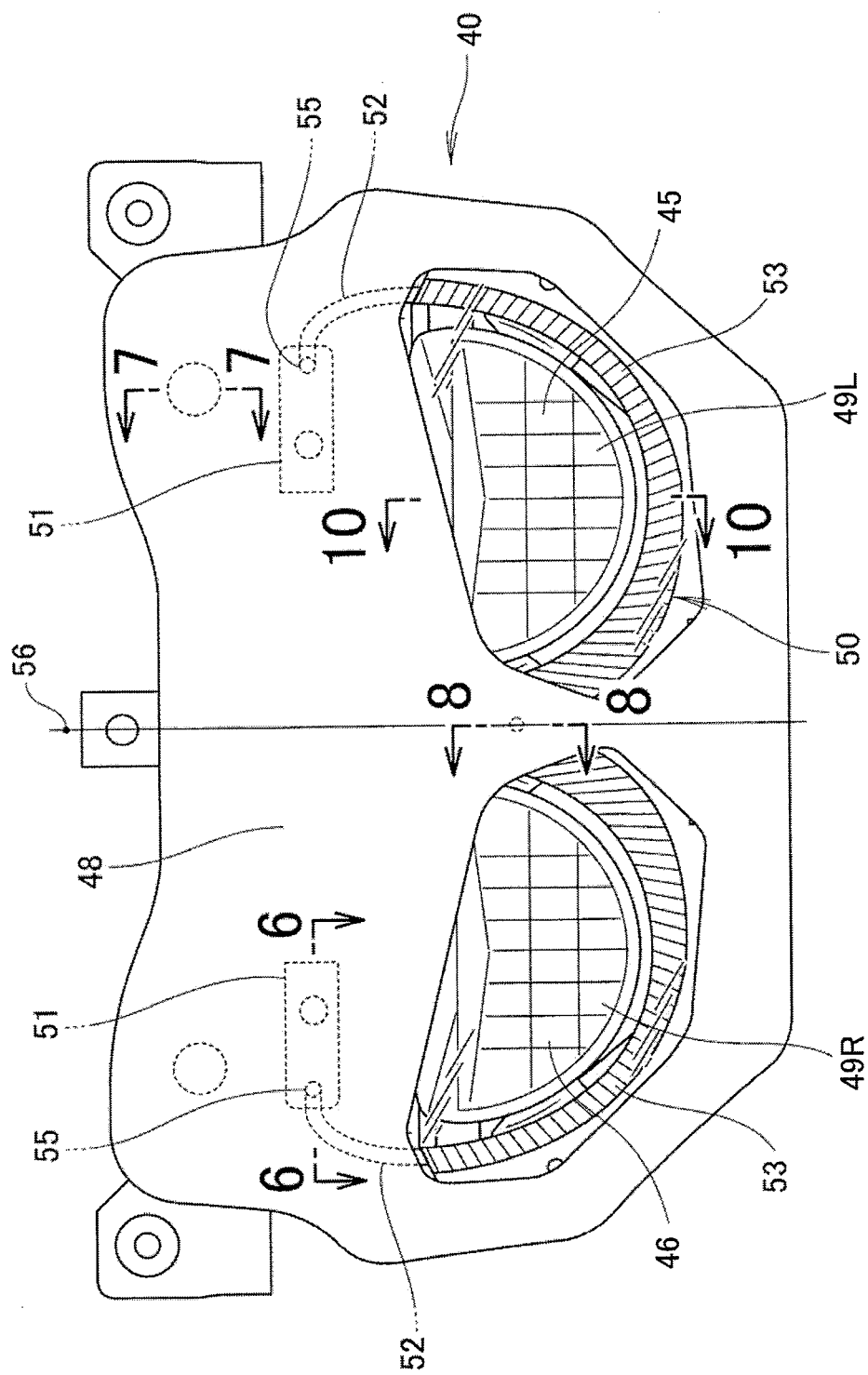
FIG. 5 is a front view of the headlight.

As depicted in FIG. 5, the attachment portions 51, the connection portions 52, and the intermediate portion (reference symbol 54 in FIG. 4) are hidden by the light cover 48. On the other hand, the left and right reflectors 45 and 46 and the left and right shining portions 53 are visible through the lenses 49L and 49R.

In other words, the left and right reflectors 45 and 46 and the left and right lenses 49L and 49R are disposed on the left and right sides of a vehicle body center line 56. In addition, the second light sources 55 are disposed respectively at the left and right ends of the light guide member 50, which has a roughly W-shaped form.

Figure 6:
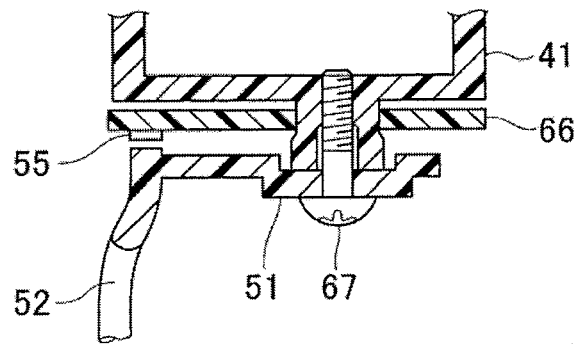
FIG. 6 is a sectional view taken along line 6-6 of FIG. 5.

As shown in FIG. 6, the second light source 55 is a light emitting diode, and is integrally formed on a substrate 66. The substrate 66 is put on the housing 41, and the attachment portion 51 is laid on the substrate 66 so that the second light source 55 and the connection portion 52 overlap with each other. Then, the attachment portion 51 and the substrate 66 are co-fastened to the housing 41 by a screw 67.

Figure 7:
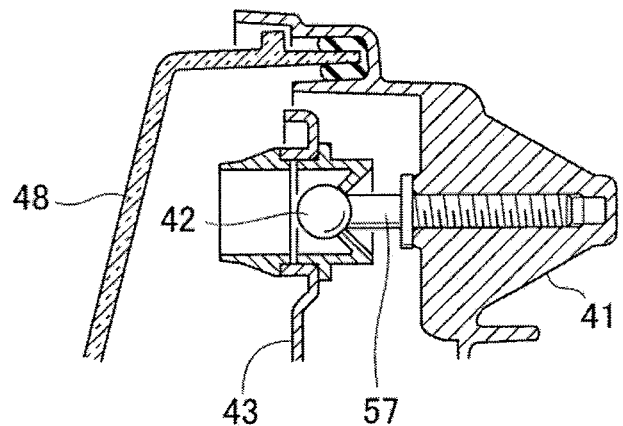
FIG. 7 is a sectional view taken along line 7-7 of FIG. 5.

As depicted in FIG. 7, a pivot bolt 57 is screwed into an upper portion of the housing 41 from the light cover 48 side. A bolt head of the pivot bolt 57 is the spherical pivot 42, to which the adjustment plate 43 is swingably attached.

Figure 8:
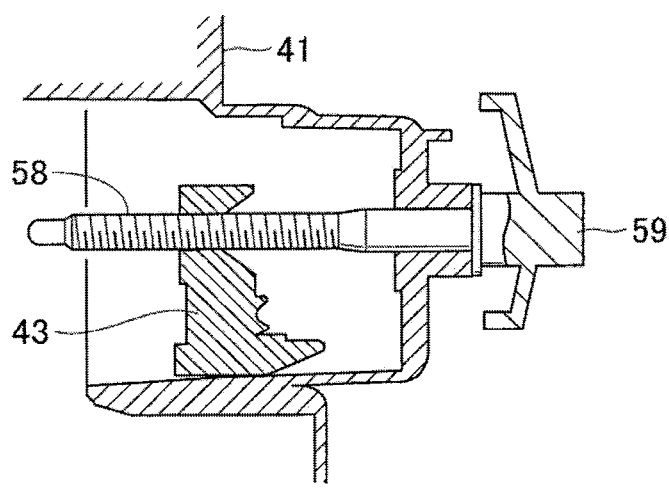
FIG. 8 is a sectional view taken along line 8-8 of FIG. 5.

As shown in FIG. 8, an optical axis adjustment screw 58 is attached to a lower portion of the housing 41. The optical axis adjustment screw 58 is rotated by turning an adjustment knob 59. The optical axis adjustment screw 58 is in screw engagement with a lower portion of the adjustment plate 43. With the optical axis adjustment screw 58 turned, the lower portion of the adjustment plate 43 is made to advance or retract. As a result, the adjustment plate 43 is oscillated about the pivot (reference symbol 42 in FIG. 7), whereby an optical axis adjustment (aiming) can be achieved.

Figure 9:
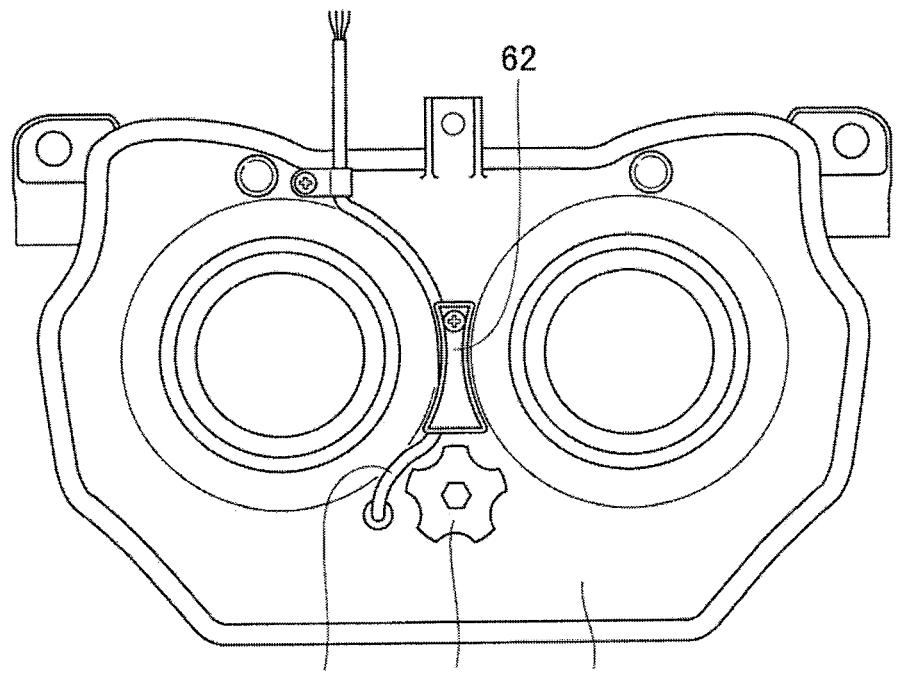
FIG. 9 is a back elevation of the headlight.

As illustrated in FIG. 9, the adjustment knob 59 is disposed at a lower portion in the center in the vehicle width direction of the housing 41. A harness 61, laid in the vicinity of the adjustment knob 59, is positioned by a harness retainer 62 in such a position so as not to hamper turning of the adjustment knob 59.

Figure 10:
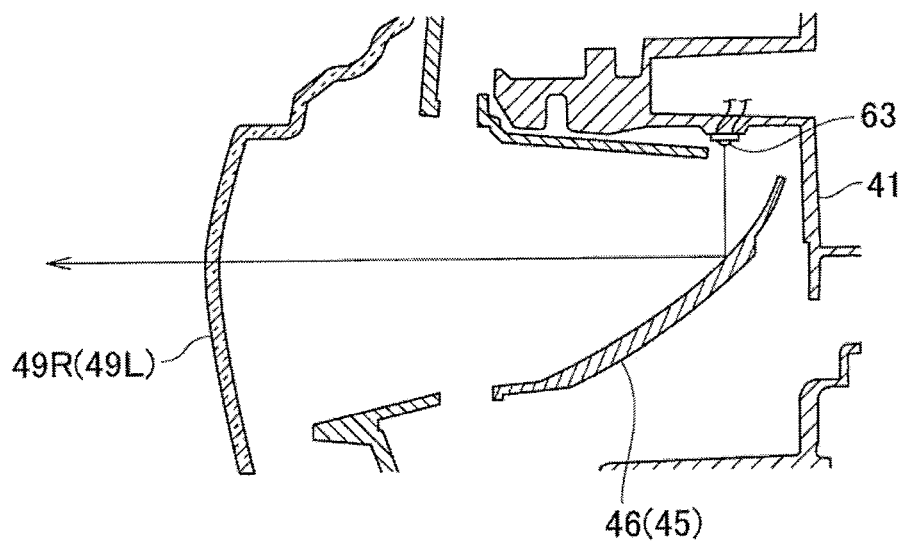
FIG. 10 is a sectional view taken along line 10-10 of FIG. 5.

As shown in FIG. 10, a first light source 63 is attached to the housing 41 at a position over the reflector 46. The first light source 63 is a light emitting diode which emits light downward. The light is reflected by the reflector 46 to pass through the lens 49R and travel toward the forward side of the vehicle.

Since there is a vacant space on the upper side of the reflector 46, the first light source 63 is disposed there. In addition, since there is the vacant space on the upper side of the reflector 46, the second light source 55 is disposed there. Thus, the plurality of light sources 55 and 63 are disposed at substantially the same height, so that a power feeding system can be laid easily.

As illustrated in FIG. 11(a) and FIG. 11(b), turning-on and turning-off of the left and right first light sources 63 and the left and right second light sources 55 are controlled by a control unit 64.

More specifically, in a high beam mode, as depicted in FIG. 11(a), the left and right first light sources 63 are turned on and the second light sources 55 are turned on. As a result, the left and right reflectors 45 and 46 shine, and the light guide member 50 shines.

When a low beam mode is selected, as shown in FIG. 11(b), the first light source 63 on the high/low-beam reflector 45 side is turned on and the second light sources 55 are turned on, but the first light source 63 on the high-beam reflector 46 side is turned off. As a result, the left reflector 45 shines, and the light guide member 50 shines.

The operation of the control unit 64 as aforementioned is merely a preferable example, and the form of turning-on/turning-off may be modified, as required.

While the saddle type vehicle on which the headlight of the present invention is mounted has been a motorcycle in the aforementioned embodiment, the saddle type vehicle may be a three-wheeled vehicle or four-wheeled vehicle.

While the light guide member 50 has been roughly W-shaped in the above embodiment, the shape may be modified. For example, in the case of a so-called single type headlight, a U-shape is suitable. In the case of a U-shaped light guide member, it is possible not only to provide two second light sources at both ends of the light guide member, but also to provide a second light source only at one end of the light guide member.

The headlight according to the present invention is suitable for a saddle type vehicle having two wheels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A headlight structure for a vehicle, comprising:
a first light source accommodated in a housing, the first light source being adapted to emit headlight rays;
a light-blocking light cover covering a front surface of the housing;
a reflector disposed between the light-blocking light cover and the housing, the reflector reflecting forward the rays emitted by the first light source; and
a lens provided on the light-blocking light cover, the lens permitting transmission of the rays therethrough while converging the rays;
wherein the headlight structure further comprises:
a light guide member mounted to the housing so as to fringe a periphery of the reflector, the light guide member being adapted to permit light to travel on therethrough and being adapted to shine; and
a second light source disposed to be hidden behind the light-blocking light cover when viewed from a vehicle front side, the second light source adapted to emit light guide member rays toward the light guide member; and
a control unit adapted to control turned-on states of the first light source and the second light source.

2. The headlight structure for a vehicle according to claim 1, wherein the reflector is a lower half concave mirror obtained by removing an upper half from a concave mirror;
the first light source is a light emitting diode for emitting rays downwardly; and
the second light source is disposed above the reflector.

3. The headlight structure for a vehicle according to claim 2, wherein the vehicle is a saddle vehicle;
the first light source, the reflector and a lens are disposed on each of left and right sides of a vehicle body center line of the vehicle;
the light guide member is roughly W-shaped when viewed from the vehicle front side; and
the second light source is attached to each of left and right sides of the light guide member.

4. The headlight structure for a vehicle according to claim 3, wherein of the left and right reflectors, one is a high-beam reflector for exclusive use for a high beam, and the other is a high/low-beam reflector for combined use for high and low beams;
the control unit, when a high beam mode is selected, performs a control such as to turn on the left and right first light sources and to turn on the second light source; and
the control unit, when a low beam mode is selected, performs a control such as to turn on the first light source on the side of the high/low-beam reflector, turn on the second light source, and turn off the first light source on the side of the high-beam reflector.

5. The headlight structure for a vehicle according to claim 4, wherein the light guide member includes a shining portion permitting shining with introduced light, and a connection portion interconnecting the second light source and the shining portion, the connection portion being circular in cross section.

6. The headlight structure for a vehicle according to claim 3, wherein the light guide member includes a shining portion permitting shining with introduced light, and a connection portion interconnecting the second light source and the shining portion, the connection portion being circular in cross section.

7. The headlight structure for a vehicle according to claim 2, wherein the light guide member includes a shining portion permitting shining with introduced light, and a connection portion interconnecting the second light source and the shining portion, the connection portion being circular in cross section.

8. The headlight structure for a vehicle according to claim 1, wherein the light guide member includes a shining portion permitting shining with an introduced light, and a connection portion interconnecting the second light source and the shining portion, the connection portion being circular in cross section.

9. The headlight structure for a vehicle according to claim 8, wherein the shining portion is shaped to increase in width as a distance from the second light source increases wherein a width "b" at a central portion of the light guide member is greater that a width "a" at both ends thereof wherein a<b.

10. The headlight structure for a vehicle according to claim 1, and further including an optical axis adjustment screw operatively connected to a lower portion of the housing for advancing or retracting an adjustment plate for aiming the first light source.

11. A headlight structure for a vehicle, comprising:
a first light source accommodated in a housing, the first light source being adapted to emit headlight rays;
a light-blocking light cover for covering a portion of a front surface of the housing;
a reflector disposed between the light-blocking light cover and the housing, the reflector reflecting forward the rays emitted by the first light source; and
a lens provided on the light-blocking light cover for permitting transmission of the rays therethrough while converging the rays;
wherein the headlight structure further comprises:
a light guide member mounted on the housing around a portion of a periphery of the reflector, the light guide member being adapted to permit light to travel on therethrough and being adapted to shine; and
a second light source disposed behind the light-blocking light cover when viewed from a vehicle front side, the second light source being adapted to emit light guide member rays toward the light guide member; and
a control unit adapted to control a turned-on state and a turn-off state of the first light source and the second light source.

12. The headlight structure for a vehicle according to claim 11, wherein the reflector is a lower half concave mirror obtained by removing an upper half from a concave mirror;
the first light source is a light emitting diode for emitting rays downwardly; and
the second light source is disposed above the reflector.

13. The headlight structure for a vehicle according to claim 12, wherein the vehicle is a saddle vehicle;
the first light source, the reflector and a lens are disposed on each of left and right sides of a vehicle body center line of the vehicle;
the light guide member is roughly W-shaped when viewed from the vehicle front side; and
the second light source is attached to each of left and right sides of the light guide member.

14. The headlight structure for a vehicle according to claim 13, wherein of the left and right reflectors, one is a high-beam reflector for exclusive use for a high beam, and the other is a high/low-beam reflector for combined use for high and low beams;
the control unit, when a high beam mode is selected, performs a control such as to turn on the left and right first light sources and to turn on the second light source; and
the control unit, when a low beam mode is selected, performs a control such as to turn on the first light source on the side of the high/low-beam reflector, turn on the second light source, and turn off the first light source on the side of the high-beam reflector.

15. The headlight structure for a vehicle according to claim 14, wherein the light guide member includes a shining portion permitting shining with introduced light, and a connection portion interconnecting the second light source and the shining portion, the connection portion being circular in cross section.

16. The headlight structure for a vehicle according to claim 13, wherein the light guide member includes a shining portion permitting shining with introduced light, and a connection portion interconnecting the second light source and the shining portion, the connection portion being circular in cross section.

17. The headlight structure for a vehicle according to claim 12, wherein the light guide member includes a shining portion permitting shining with introduced light, and a connection portion interconnecting the second light source and the shining portion, the connection portion being circular in cross section.

18. The headlight structure for a vehicle according to claim 11, wherein the light guide member includes a shining portion permitting shining with an introduced light, and a connection portion interconnecting the second light source and the shining portion, the connection portion being circular in cross section.

19. The headlight structure for a vehicle according to claim 18, wherein the shining portion is shaped to increase in width as a distance from the second light source increases wherein a width "b" at a central portion of the light guide member is greater that a width "a" at both ends thereof wherein a<b.

20. The headlight structure for a vehicle according to claim 11, and further including an optical axis adjustment screw operatively connected to a lower portion of the housing for advancing or retracting an adjustment plate for aiming the first light source.

* * * * *